United States Patent
Noguchi et al.

(10) Patent No.: US 6,773,481 B2
(45) Date of Patent: Aug. 10, 2004

(54) POROUS HONEYCOMB FILTER AND MANUFACTURING METHOD THEREOF

(75) Inventors: Yasushi Noguchi, Nagoya (JP); Hideaki Nishi, Toyoake (JP); Hiroyuki Suenobu, Nagoya (JP)

(73) Assignee: NGK Insulators, Ltd. (JP)

( * ) Notice: Subject to any disclaimer, the term of this patent is extended or adjusted under 35 U.S.C. 154(b) by 41 days.

(21) Appl. No.: 10/181,401

(22) PCT Filed: Oct. 3, 2001

(86) PCT No.: PCT/JP01/08720

§ 371 (c)(1),
(2), (4) Date: Jul. 17, 2002

(87) PCT Pub. No.: WO02/41972

PCT Pub. Date: May 30, 2002

(65) Prior Publication Data

US 2003/0041574 A1 Mar. 6, 2003

(30) Foreign Application Priority Data

Nov. 24, 2000 (JP) .................................... 2000-357305
Jun. 22, 2001 (JP) .................................... 2001-190404

(51) Int. Cl.⁷ .......................................... B01D 39/20
(52) U.S. Cl. ................. 55/523; 55/DIG. 5; 55/DIG. 30; 264/44
(58) Field of Search ................ 55/385.3, 523, 55/DIG. 5, DIG. 16, DIG. 30, DIG. 10; 264/42–44

(56) References Cited

U.S. PATENT DOCUMENTS

| | | | | |
|---|---|---|---|---|
| 4,632,683 A | | 12/1986 | Fukutani et al. ............... 55/523 |
| 4,652,286 A | * | 3/1987 | Kusuda et al. ................. 55/523 |
| 4,921,616 A | * | 5/1990 | Minjolle ...................... 210/767 |
| 5,069,697 A | * | 12/1991 | Hamaguchi et al. ........... 55/523 |
| 5,198,006 A | * | 3/1993 | Mimori et al. ................. 55/523 |
| 5,545,243 A | * | 8/1996 | Kotani et al. .................. 55/523 |
| 5,549,725 A | | 8/1996 | Kasai et al. .................... 55/523 |
| 5,733,352 A | * | 3/1998 | Ogawa et al. .................. 55/523 |
| 5,914,187 A | * | 6/1999 | Naruse et al. ............... 428/327 |
| 6,261,982 B1 | * | 7/2001 | Takahashi et al. ........... 501/118 |
| 2003/0006518 A1 | * | 1/2003 | Miyakawa et al. ........... 264/42 |
| 2003/0024219 A1 | * | 2/2003 | Harada et al. ................. 55/523 |
| 2003/0093982 A1 | * | 5/2003 | Suwabe et al. ................ 55/523 |
| 2003/0110744 A1 | * | 6/2003 | Gadkaree et al. ............. 55/523 |

FOREIGN PATENT DOCUMENTS

| | | |
|---|---|---|
| EP | 0 834 343 A1 | 4/1998 |
| EP | 1 025 903 A1 | 8/2000 |
| WO | WO 02/41972 A1 | 5/2002 |

* cited by examiner

Primary Examiner—Robert H. Spitzer
(74) Attorney, Agent, or Firm—Parkhurst & Wendel, L.L.P.

(57) ABSTRACT

A porous honeycomb filter made from a material containing cordierite, of which pore distribution is controlled, as the primary crystalline phase. The pore distribution is such that the volume of a pore with a diameter of below 10 $\mu$m is 15% or less of the total pore volume, the volume of a pore with a diameter of 10 to 50 $\mu$m is 75% or more of the total pore volume, and the volume of a pore with a diameter of above 50 $\mu$m is 10% or less of the total pore volume. This porous honeycomb filter has a high collection efficiency for fine particles (particulates), or the like, and can prevent increase in pressure loss due to the plugging of pores, and particularly can exploit the characteristics thereof for diesel engines that use recent high-pressure fuel injection, common rails, etc.

15 Claims, No Drawings

POROUS HONEYCOMB FILTER AND MANUFACTURING METHOD THEREOF

TECHNICAL FIELD

The present invention relates to a porous honeycomb filter and a manufacturing method thereof, and more particularly to a porous honeycomb filter that has a high efficiency in collecting fine particles (particulates) and the like. This porous honeycomb filter can prevent an increase in pressure loss due to the plugging of pores, and it is especially suitable for exploiting the characteristics thereof for diesel engines that use recent high-pressure fuel injection, common rails, etc. The invention also relates to a manufacturing method thereof.

BACKGROUND ART

Porous honeycomb filters, having a structure in which a plurality of through holes opened to the end surface of the exhaust gas flow-in side and to the end surface of the exhaust gas flow-out side are alternately sealed at both the end surfaces, have recently been used as apparatuses for removing particulate in exhaust gas. In these porous honeycomb filters the exhaust gas that flows in at the exhaust gas flow-in side end surface is forced to pass through partition walls (having a plurality of pores) between through holes to thereby collect and remove particulate in exhaust gas.

In this porous honeycomb filter, the pore distribution needs to be controlled because performance figures such as collection efficiency and pressure loss vary depending on the diameter of the pores formed on partition walls between through holes in relation to the size of particulates in the exhaust gas.

Traditionally, a porous honeycomb filter made from cordierite, which is excellent in heat resistance, or from silicon carbide, which is frequently used. For porous honeycomb filters made from silicon carbide, of which pore diameter is easily controlled, a filter with an average pore diameter of 1 to 15 μm and the pore diameter thereof being controlled with the standard deviation (SD) of as extremely narrow a range as 0.20 or less in the pore distribution, has been disclosed (JP-A-5-23512).

On the other hand, for porous honeycomb filters made from cordierite where the pore diameter is controlled, a honeycomb filter has been disclosed with an average pore diameter of 25 to 40 μm. It is obtained by a manufacturing method in which the porosity is increased by not causing kaolin and aluminum oxide to be contained in the cordierite-forming raw material and also by using a raw material made by adding a specified organic blowing agent or a flammable substance to a cordierite raw material. The cordierite raw material is composed of aluminium hydroxide (the powders with particle diameters of 0.5 to 3 μm and of 5 to 15 μm make up 50 to 100% of the whole of the aluminium hydroxide), fused silica (average particle diameter of 30 to 100 μm) and talc, of which particle diameter is controlled within a specified range, has been disclosed (JP-A-9-77573).

However, in this honeycomb filter, the pore diameter thereof is primarily controlled by aluminium hydroxide and an organic blowing agent or a flammable substance, and so the average pore diameter was capable of being controlled, but the pore distribution was not capable of being set in a desired narrow range. In addition, the aluminium hydroxide was made to become coarse particles, thereby causing the problem of increasing the coefficient of thermal expansion as well.

To the contrary, honeycomb filters made by a manufacturing method in which a raw material prepared by adding graphite as a pore-forming agent to a cordierite-forming raw material produced by making each component of talc, silica, alumina and kaolin a powder of a specific particle diameter and then mixing them in specific contents, with pore distributions in which <1> the pores with a diameter of 2 μm or less makes up 7% by volume or less of the total pore volume, and <2> the pores with a diameter of 100 μm or more makes up 10% by volume or less of the total pore volume have been disclosed, respectively, in Japanese Patent Nos. 2578176 and 2726616.

In these honeycomb filters, however, the difference in easiness of controlling the pore diameter for each component was not taken into consideration, and therefore the lower limit or the upper limit of the pore distribution was only controlled at most and it was impossible to set the pore distribution in a desired narrow range.

To the contrary, a honeycomb filter where a pore with pore diameters of 10 to 50 μm makes up 52.0 to 74.1% by volume of the total pores, is obtained by a manufacturing method in which, focusing on the difference in easiness of controlling the pore diameter for each component of talc, silica, alumina and kaolin, a cordierite-forming raw material is prepared by setting the powder with a particle diameter of 150 μm or more to be 3% by weight or less of the whole raw material and also setting the powder with a particle diameter of 45 μm or less to be 25% by weight or less, for both talc and silica, has been proposed (JP-A-7-38930).

In this honeycomb filter, the pore diameter thereof is controlled in a narrow range of from 10 to 50 μm for the first time in a honeycomb filter made from cordierite. Compared with a variety of cordierite honeycomb filters mentioned above, the filter can not only increase collection efficiency, but also prevents an increase in pressure loss by the prevention of plugging. In addition, the filter can lower the coefficient of thermal expansion by decreasing the particle diameter of the talc contained in the filter.

However, particulates in exhaust gas have lately been made small and been homogenized (particle diameter of particulates is almost about 1 μm) with decreasing emission as a result of improved diesel engines (high-pressure fuel injection, common rails, etc. are used), and thus a honeycomb filter in which the pore diameter is extremely highly controlled has been strongly required.

On the contrary, while the aforementioned honeycomb filter has been produced, completely neglecting a close association of kaolin in a cordierite-forming raw material with the formation of a pore of 10 μm or less, pores with a diameter of 10 to 50 μm cannot be formed at a high level of 75.0% by volume or more, so that recent demand cannot be satisfied.

The present invention has been made considering the aforementioned problem, and the objects thereof are to provide a porous honeycomb filter that has a high efficiency in collecting fine particles (particulates) and the like and prevents an increase in pressure loss due to the plugging of the pores, especially suitable for exploiting these characteristics for diesel engines that use recent high-pressure fuel injection, common rails, etc., and also to provide a manufacturing method thereof.

DISCLOSURE OF THE INVENTION

The inventors, as a result of studies to solve the aforementioned problem, have found out that the pore size distribution can be highly controlled in a desired range by regulating the particle diameter of the silica component of a cordierite-forming raw material and also lowering the concentration of the kaolin, and have completed the present invention.

In other words, the present invention provides a porous honeycomb filter made from a raw material composed of cordierite as the primary crystalline phase, of which the pore distribution is controlled, characterized in that, in the pore distribution, the volume of a pore with a diameter of less than 10 μm is 15% or less of the total pore volume, the volume of a pore with a diameter of 10 to 50 μm is 75% or more of the total pore volume, and the volume of a pore with a diameter of above 50 μm is 10% or less of the total pore volume.

In a honeycomb filter of the present invention, the porosity of the honeycomb filter is preferably 50 to 75%, more preferably 65 to 75%, and particularly preferably 68 to 75%. In addition, the coefficient of thermal expansion of the honeycomb filter is preferably $1.0 \times 10^{-6}/°$ C. or less at 40 to 800° C.

Further, the present invention provides a method of manufacturing a porous honeycomb filter, using a ceramic raw material primarily composed of a cordierite-forming raw material, in which the cordierite-forming raw material contains 10% by weight or less of kaolin and also has a particle size distribution in which the raw material contains 1% by weight or less of a powder with a particle diameter of 75 μm or more of silica ($SiO_2$) source components except both kaolin and talc.

In the method of manufacturing a honeycomb filter of the present invention, the filter can contain 1 to 10% by weight of kaolin, in contrast to the manufacturing method described in Japanese Patent Laid-Open 9-77573.

In addition, silica ($SiO_2$) source components except both kaolin and talc preferably contain at least one species of quartz and fused silica.

Furthermore, a cordierite-forming raw material preferably contains as alumina ($Al_2O_3$) source components at least one species of aluminium oxide and aluminium hydroxide. In this case, the raw material preferably contains as alumina ($Al_2O_3$) source components 15 to 45% by weight of aluminium hydroxide with a particle diameter of 1 to 10 μm, or 0 to 20% by weight of aluminium oxide with a particle diameter of from 4 to 8 μm.

Additionally, a cordierite-forming raw material preferably contains 37 to 40% by weight of talc as a magnesia (MgO) source component. In this case, the particle diameter of the talc is preferably 5 to 40 μm.

Further, a ceramic raw material preferably contains 1 to 4 parts by weight of foam resin with respect to 100 parts by weight of a cordierite-forming raw material.

BEST MODE FOR CARRYING OUT THE INVENTION

Embodiments of the present invention will be described in detail in the following.

1. Porous Honeycomb Filter

A porous honeycomb filter of the present invention is a porous honeycomb filter made from cordierite as the primary crystalline phase, of which pore distribution is highly controlled in a specified range.

A detailed description will be given in the following.

A porous honeycomb filter of the present invention is made from cordierite as the primary crystal and the cordierite may be selected from any one form of oriented, unoriented, α crystalline, and β crystalline forms, and the like.

In addition, the filter may contain other crystalline phases, including mullite, zircon, aluminium titanate, clay bond silicon carbide, zirconia, spinel, indialite, sapphirine, corundum and titania.

Further, these crystalline phases may be contained as a single species or as two or more species at the same time.

In the pore distribution of a porous honeycomb filter of the present invention, the volume of a pore with a diameter of below 10 μm is 15% or less of the total pore volume, the volume of a pore with a diameter of 10 to 50 μm is 75 to 100% of the total pore volume, and the volume of a pore with a diameter of above 50 μm is 10% or less of the total pore volume.

When the volume of a pore with a diameter of 10 to 50 μm comes to be less than 75% of the total pore volume and the volume of a pore with a diameter of below 10 μm exceeds 15% of the total pore volume, a pressure loss is increased due to the plugging of pores. Further, when a catalyst is made to attach to the filter, a pressure loss is increased due to plugging of pores caused by the catalyst. On the other hand, when the volume of a pore with a diameter of 10 to 50 μm comes to be less than 75% of the total pore volume and the volume of a pore with a diameter of above 50 μm exceeds 10% of the total pore volume, the efficiency in collecting particulates is decreased.

In particular, since particulates are made small and homogenized as a result of recent improved diesel engines, it is difficult to increase the collection efficiency for particulates in line with such improvement in diesel engines, unless the volume of a pore with a diameter of 10 to 50 μm is as high as 75% or more of the total pore volume for high efficiency.

In a honeycomb filter of the present invention, from the viewpoint of decreasing pressure loss and increasing collection efficiency, the porosity is preferably 50 to 75%, more preferably from 65 to 75% and particularly preferably 68 to 75%. In addition, in terms of improving thermal shock resistance when in use at high temperature, the coefficient of thermal expansion is preferably $1.0 \times 10^{-6}/°$ C. or less at 40 to 800° C.

Although a honeycomb filter of the present invention normally has a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like an "doglegged shape," or the like. In addition, the shape of through holes is not particularly limited. For example, the sectional shape may be a polygon such as a square or an octagon, a circle, an ellipse, or the like.

Furthermore, a porous honeycomb filter of the present invention can be manufactured by a method described below, or the like.

2. A Method of Manufacturing a Porous Honeycomb Filter

A method of manufacturing a porous honeycomb filter of the present invention is a method of manufacturing a porous honeycomb filter using a ceramic raw material made from a primary raw material of a cordierite-forming raw material, in which the contents and particle diameters of specific components in a cordierite-forming raw material are controlled in specified ranges.

Detailed descriptions will be given in the following.

A cordierite-forming raw material used in the present invention has a particle size distribution in which the raw material contains 1% by weight or less of a powder with a particle diameter of 75 μm or more of silica ($SiO_2$) source components except both kaolin and talc, or more preferably 0.5% by weight or less.

As a result, pores with a narrow diameter range of 10 to 50 μm can be formed in an extremely high yield and a honeycomb filter having a high collection efficiency and exhibiting no increase in pressure loss due to plugging of pores can be manufactured.

In other words, the present invention has found out that silica ($SiO_2$) source components except both kaolin and talc in a cordierite-forming raw material, which are different from other components, can form pores of diameters substantially corresponding to the particle sizes of components, and that, noticing that the silica source components rarely participate in forming a pore with a diameter of 10 μm or less, pores with a narrow diameter range of 10 to 50 μm can be formed in an extremely high yield by removing a coarse powder with a diameter of 75 μm or more.

Silica ($SiO_2$) source components except both kaolin and talc include quartz, fused silica and mullite. Of them, at least one species of quartz and fused silica is preferably contained because they stably exist to high temperature during firing and pore diameters thereof are easily controlled.

A cordierite-forming raw material preferably contains 15 to 20% by weight of these silica ($SiO_2$) source components. In addition, $Na_2O$, $K_2O$, etc. may be contained as impurities, and the total content of these impurities in silica ($SiO_2$) source components is preferably 0.01% by weight or less because containing these impurities can prevent an increase in the coefficient of thermal expansion.

A cordierite-forming raw material used in the present invention should further contain 10% by weight or less of kaolin.

When the content of kaolin exceeds 10% by weight, the formation of a pore with a diameter of less than 10 μm cannot be controlled, so that it becomes impossible to set the volume of a pore with a diameter of from 10 to 50 μm to be 75% or more of the total pore volume even though the particle sizes of the aforementioned silica ($SiO_2$) source components except both kaolin and talc are controlled.

That is, in the present invention, in addition to the control of the particle size distribution of the aforementioned silica ($SiO_2$) source components, noticing that the kaolin in a cordierite-forming raw material mainly participates in forming a pore with a diameter of less than 10 μm, the formation of the pore with a diameter of less than 10 μm has been found to be able to be almost controlled by decreasing the content of kaolin to 10% by weight or less.

Additionally, in the present invent, since the content of kaolin is constrained by controlling the pore distribution, kaolin may be contained in the range of from 1 to 10% by weight, in contrast to the manufacturing method described in JP-A-9-77573.

In addition, although kaolin may contain mica, quartz, etc. as impurities, containing these impurities can prevent an increase in the coefficient of thermal expansion, and so the content is preferably 2% by weight or less.

Because each component for a cordierite-forming raw material used in the present invention is formulated to prepare a cordierite crystal with a theoretical composition, in addition to both the aforementioned silica ($SiO_2$) source components and kaolin, for example, magnesia (MgO) source components such as talc and alumina ($Al_2O_3$) source components such as aluminium oxide and aluminium hydroxide need to be formulated.

As alumina ($Al_2O_3$) source components, one or both species of aluminium oxide and aluminium hydroxide, which have few impurities, are preferably contained, and particularly aluminium hydroxide is preferably contained.

In addition, some particle sizes of alumina ($Al_2O_3$) source components can lower the coefficient of thermal expansion and also can precisely control the pore size distribution by means of the particle size distribution of the aforementioned silica ($SiO_2$) source components, and thus the particle diameter of aluminium hydroxide is preferably 1 to 10 μm and the particle diameter of aluminium oxide is preferably 4 to 8 μm.

Furthermore, for alumina ($Al_2O_3$) source components, a cordierite-forming raw material preferably contains 15 to 45% by weight of aluminium hydroxide and preferably contains 0 to 20% by weight of aluminium oxide.

Magnesia (MgO) source components, for example, include talc and magnesite and particularly talc is preferably contained. A cordierite-forming raw material preferably contains 37 to 40% by weight of talc. The particle diameter of talc, which lowers the coefficient of thermal expansion, is preferably 5 to 40 μm, more preferably 10 to 30 μm.

In addition, magnesia (MgO) source components such as talc used in the present invention may contain impurities, including $Fe_2O_3$, CaO, $Na_2O$ and $K_2O$.

However, the content of $Fe_2O_3$ in magnesia (MgO) source components is preferably 0.1 to 2.5% by weight. A content in this range can lower the coefficient of thermal expansion and can also provide a high porosity.

In addition, containing CaO, $Na_2O$ and $K_2O$ lowers the coefficient of thermal expansion, and so the total content thereof in magnesia (MgO) source components is preferably 0.35% by weight or less.

The manufacturing method of the present invention can increase collection efficiency and also decrease pressure loss by further increasing porosity, and thus a cordierite-forming raw material preferably contains as an additive a pore-forming agent, or the like for forming pores.

Pore-forming agents, for example, include foam resins such as acrylic microcapsules, graphite, flour, starch, phenolic resin, poly(methyl methacrylate), polyethylene, and poly(ethylene terephthalate) and expanded foam resins such as acrylic microcapsules are preferable.

Expanded foam resins such as acrylic microcapsules are hollow and thus can, in a few amount, provide a honeycomb filter of a high porosity and can restrain heat liberation of a pore-forming material in a firing step, thereby lowering heat liberation in the firing step and decreasing generation of thermal stress even when a honeycomb filter of a high porosity is prepared by adding a pore-forming material.

Of course, although addition of a large amount of foam resin makes the porosity of an obtained honeycomb filter extremely large, the intensity is decreased to cause the filter to be easily damaged during canning, or the like. Accordingly, the content of foam resin is preferably 1.0 to 4.0 parts by weight with respect to 100 parts by weight of a cordierite-forming raw material, more preferably 1.5 to 3.0 parts by weight.

In the present invention, as necessary, other additives can be contained; for example, a binder or a dispersant for promoting the dispersion into the medium of fluid may be contained.

In addition, a binder includes hydroxypropylmethyl cellulose, methyl cellulose, hydroxyethyl cellulose, carboxylmethyl cellulose, or polyvinyl alcohol; a dispersant includes ethylene glycol, dextrin, fatty acid soap, or polyalcohol.

Further, each additive described above can be used singly or in combination of two species or more, depending on purpose.

In the present invention, nothing is limited except that the contents and particle diameters of particular components in a cordierite-forming raw material are controlled in specified ranges. For example, a honeycomb filter can be produced in the following manufacturing process.

First, with respect to 100 parts by weight of the aforementioned cordierite-forming raw material, 3 to 5 parts by weight of a binder, 2 to 40 parts by weight of a pore-forming agent, 0.5 to 2 parts by weight of dispersant, and 10 to 40 parts by weight of water are charged and then kneaded, and the compound is plasticized.

Second, molding of a raw material to be plasticized can be carried out by means of the extrusion method; the injection molding method; the compression molding method; a method in which after a ceramic raw material is molded in a cylindrical shape, the through hole is molded; or the like. Of them, the extrusion method, which easily permits continuous molding and causes a cordierite crystal to be oriented leading to low thermal expansion coefficient, is preferably used.

Third, drying of a raw molded article can be carried out by hot-air drying, microwave drying, dielectric drying, reduced-pressure drying, vacuum drying, freezing drying, or the like. Of them, a drying step of a combination of hot-air drying and microwave drying or of hot-air drying and dielectric drying is preferable in terms of being able to dry the whole rapidly and homogeneously.

Finally, firing of a dried molded article, although depending on the size of the dried molded article, is normally conducted preferably at a temperature of 1410 to 1440° C. for 3 to 7 hours. In addition, the drying step and the firing step may be conducted continuously.

Examples of the present invention will be described in detail in the following. However, the present invention is not limited to the examples.

1. Evaluation Method

Honeycomb filters obtained in the examples and comparative examples described later were evaluated by the following methods.

(1) Pore Distribution and Average Diameter of Pores

Pore distributions and average diameters of pores were measured by a mercury injection porosimeter manufactured by Micromeritics Corporation.

(2) Porosity

Porosity was calculated from the total pore volume, regarding the absolute specific gravity of cordierite as 2.52 g/cc.

(3) Collection Efficiency

Exhaust gas with soot generated by a soot generator was passed through a honeycomb filter prepared in each example or comparative example for a constant time (2 minutes). After filtration, the soot contained in the exhaust gas was collected with a filter paper and then the weight ($W^1$) of the soot was measured. Also, exhaust gas with soot generated for the same time was collected with a filter paper without being passed through a filter and then the weight ($W^2$) of the soot was measured. Thus obtained weights ($W^1$ and $W^2$) were substituted in the equation (1) below to evaluate collection efficiencies.

$$(W^2-W^1)/(W^2) \times 100 \quad (1)$$

(4) Soot Collection Pressure Loss

First, to both end surfaces of a honeycomb filter obtained in each example or comparative example was pressed against a ring with an inside diameter φ of 130 mm and soot generated by a soot generator through this ring was flowed within the range of 130 mm φ of the honeycomb filter to collect 10 g of soot.

Finally, air of 2.27 Nm3/min was flowed, with the soot collected on honeycomb filter, and then the pressure difference upstream and downstream the filter was measured to evaluate the pressure loss in a state in which the soot is collected.

EXAMPLES AND COMPARATIVE EXAMPLES

Example 1

A cordierite-forming raw material was prepared by mixing talc (average particle diameter of 20 μm, 4% by weight of a powder with a particle diameter of 75 μm or more), fused silica B (average particle diameter of 35 μm, 0.5% by weight of a powder with a particle diameter of 75 μm or more), and aluminium hydroxide (average particle diameter of 2 μm, 0% by weight of a powder with a particle diameter of 75 μm or more), of the average particle diameters and particle size distributions as shown in Table 1, in the ratio of 37% by weight of the talc, 19% by weight of the fused silica B and 44% by weight of the aluminium hydroxide as shown in Table 2.

Then, as shown in Table 2, with respect to 100 parts by weight of this cordierite-forming raw material, 20 parts by weight of graphite, 7 parts by weight of poly(ethylene terephthalate), 7 parts by weight of poly(methyl methacrylate), 4 parts by weight of hydroxypropylmethyl cellulose, 0.5 parts by weight of potassium laurate soap and 30 parts by weight of water were charged and then kneaded, and the compound was plasticized. This plasticized raw material was made to form cylinder-shaped puddle using a vacuum tug mill and then was charged into an extrusion machine to form a honeycomb shape.

Then, the thus obtained molded article was dried by dielectric drying, absolute-dried by hot-air drying, and then the end surfaces were cut to a specified size.

And then, the through holes of the honeycomb-shaped, dried article were alternately sealed at both the end surfaces where the through hole open, using slurry made from a cordierite-forming raw material of a similar composition.

Finally, the article was fired at 1420° C. for 4 hours to give a honeycomb filter with a size of φ144 mm×L 152 mm, 300 μm in partition wall thickness and with the number of cells of 300 cells/inch$^2$.

Example 2

A honeycomb filter was obtained as in the case of Example 1, except that in Example 2 quartz B (average particle diameter of 19 μm, 0.3% by weight of a powder with a particle diameter of 75 μm or more) was mixed instead of fused silica B (average particle diameter of 35 μm, 0.5% by weight of a powder with a particle diameter of 75 μm or more).

Comparative Example 1

A honeycomb filter was obtained as in the case of Example 1, except that in Comparative Example 1 fused silica A (average particle diameter of 40 μm, 6% by weight of a powder with a particle diameter of 75 μm or more) was mixed instead of fused silica B (average particle diameter of 35 μm, 0.5% by weight of a powder with a particle diameter of 75 μm or more).

Example 3

A honeycomb filter was obtained as in the case of Example 1, except that in Example 3 a cordierite-forming raw material was prepared by mixing talc (average particle diameter of 20 μm, 4% by weight of a powder with a particle diameter of 75 μm or more), kaolin (average particle diameter of 10 μm, 2% by weight of a powder with a particle diameter of 75 μm or more), quartz D (average particle diameter of 5 μm, 0.1% by weight of a powder with a particle diameter of 75 μm or more), aluminium oxide (average particle diameter of 6 μm, 0.2% by weight of a powder with a particle diameter of 75 μm or more) and aluminium hydroxide (average particle diameter of 2 μm, 0% by weight of a powder with a particle diameter of 75 μm or more), of the average particle diameters and particle size distributions as shown in Table 1, in the ratio of 40% by weight of the talc, 1% by weight of the kaolin, 21% by weight of the quartz D, 19% by weight of the aluminium oxide and 19% by weight of the aluminium hydroxide as shown in Table 2, and except that with respect to 100 parts by weight of the thus obtained cordierite-forming raw material, 20 parts by weight of graphite, 10 parts by weight of poly(ethylene terephthalate), and 10 parts by weight of poly(methyl methacrylate) were added as pore-forming agents.

Example 4

A honeycomb filter was obtained as in the case of Example 1, except that in Example 4 a cordierite-forming raw material was prepared by mixing talc (average particle diameter of 20 μm, 4% by weight of a powder with a particle diameter of 75 μm or more), kaolin (average particle diameter of 10 μm, 2% by weight of a powder with a particle diameter of 75 μm or more), quartz B (average particle diameter of 19 μm, 0.3% by weight of a powder with a particle diameter of 75 μm or more), aluminium oxide (average particle diameter of 6 μm, 0.2% by weight of a powder with a particle diameter of 75 μm or more) and aluminium hydroxide (average particle diameter of 2 μm, 0% by weight of a powder with a particle diameter of 75 μm or more), of the average particle diameters and particle size distributions as shown in Table 1, in the ratio of 40% by weight of the talc, 3% by weight of the kaolin, 20% by weight of the quartz B, 18% by weight of the aluminium oxide and 19% by weight of the aluminium hydroxide as shown in Table 2, and except that with respect to 100 parts by weight of the thus obtained cordierite-forming raw material, 20 parts by weight of graphite, 9 parts by weight of poly(ethylene terephthalate), and 9 parts by weight of poly(methyl methacrylate) were added as pore-forming agents.

Example 5

A honeycomb filter was obtained as in the case of Example 4, except that in Example 5, instead of quartz B (average particle diameter of 19 μm, 0.3% by weight of a powder with a particle diameter of 75 μm or more) as shown in Table 1, quartz D (average particle diameter of 5 μm, 0.1% by weight of a powder with a particle diameter of 75 μm or more) was mixed as shown in Table 2, and except that with respect to 100 parts by weight of the thus obtained cordierite-forming raw material, 25 parts by weight of graphite, 5 parts by weight of poly(ethylene terephthalate), and 10 parts by weight of poly(methyl methacrylate) were added as pore-forming agents.

Example 6

A honeycomb filter was obtained as in the case of Example 4, except that in Example 6, instead of quartz B (average particle diameter of 19 μm, 0.3% by weight of a powder with a particle diameter of 75 μm or more) as shown in Table 1, quartz E (average particle diameter of 10 μm, 0.1% by weight of a powder with a particle diameter of 75 μm or more) was mixed as shown in Table 2, and except that with respect to 100 parts by weight of the thus obtained cordierite-forming raw material, 20 parts by weight of graphite and 4 parts by weight of poly(ethylene terephthalate) were added as pore-forming agents.

Example 7

A honeycomb filter was obtained as in the case of Example 4, except that in Example 7, instead of quartz B (average particle diameter of 19 μm, 0.3% by weight of a powder with a particle diameter of 75 μm or more) as shown in Table 1, fused silica B (average particle diameter of 35 μm, 0.5% by weight of a powder with a particle diameter of 75 μm or more) was mixed as shown in Table 2, and except that with respect to 100 parts by weight of the thus obtained cordierite-forming raw material, 20 parts by weight of graphite, 3 parts by weight of poly(ethylene terephthalate), and 9 parts by weight of poly (methyl methacrylate) were added as pore-forming agents.

Example 8

A honeycomb filter was obtained as in the case of Example 4, except that in Example 8, instead of quartz B (average particle diameter of 19 μm, 0.3% by weight of a powder with a particle diameter of 75 μm or more) as shown in Table 1, fused silica C (average particle diameter of 16 μm, 1% by weight of a powder with a particle diameter of 75 μm or more) was mixed as shown in Table 2, and except that with respect to 100 parts by weight of the thus obtained cordierite-forming raw material, 10 parts by weight of graphite and 17 parts by weight of poly(methyl methacrylate) were added as pore-forming agents.

Comparative Example 2

A honeycomb filter was obtained as in the case of Example 4, except that in Comparative Example 2, instead of quartz B (average particle diameter of 19 μm, 0.3% by weight of a powder with a particle diameter of 75 μm or more) as shown in Table 1, quartz A (average particle diameter of 20 μm, 8% by weight of a powder with a particle diameter of 75 μm or more) was mixed as shown in Table 2, and except that with respect to 100 parts by weight of the thus obtained cordierite-forming raw material, 20 parts by weight of graphite, 7 parts by weight of poly(ethylene terephthalate), and 9 parts by weight of poly(methyl methacrylate) were added as pore-forming agents.

Comparative Example 3

A honeycomb filter was obtained as in the case of Example 4, except that in Comparative Example 3, instead of quartz B (average particle diameter of 19 μm, 0.3% by weight of a powder with a particle diameter of 75 μm or more) as shown in Table 1, quartz C (average particle diameter of 5 μm, 3% by weight of a powder with a particle diameter of 75 μm or more) was mixed as shown in Table 2, and except that with respect to 100 parts by weight of the thus obtained cordierite-forming raw material, 20 parts by weight of graphite, 10 parts by weight of poly(ethylene terephthalate), and 10 parts by weight of poly(methyl methacrylate) were added as pore-forming agents.

Comparative Example 4

A honeycomb filter was obtained as in the case of Example 4, except that in Comparative Example 4, instead of quartz B (average particle diameter of 19 μm, 0.3% by weight of a powder with a particle diameter of 75 μm or more) as shown in Table 1, fused silica D (average particle diameter of 70 μm, 39% by weight of a powder with a particle diameter of 75 μm or more) was mixed as shown in Table 2, and except that with respect to 100 parts by weight of the thus obtained cordierite-forming raw material, 20 parts by weight of graphite, 6 parts by weight of poly (ethylene terephthalate), and 7 parts by weight of poly (methyl methacrylate) were added as pore-forming agents.

Example 9

A honeycomb filter was obtained as in the case of Example 4, except that in Example 4 a cordierite-forming raw material was prepared as shown in Table 2 by mixing the following species in the ratio of 40% by weight of talc, 5% by weight of kaolin, 19% by weight of quartz B, 17% by weight of aluminium oxide and 19% by weight of aluminium hydroxide, and except that with respect to 100 parts by weight of the thus obtained cordierite-forming raw material, 20 parts by weight of graphite, 7 parts by weight of poly(ethylene terephthalate), and 7 parts by weight of poly(methyl methacrylate) were added as pore-forming agents.

Example 10

A honeycomb filter was obtained as in the case of Example 4, except that in Example 4 a cordierite-forming raw material was prepared as shown in Table 2 by mixing the following species in the ratio of 40% by weight of talc, 10% by weight of kaolin, 17% by weight of quartz B, 16% by weight of aluminium oxide and 17% by weight of aluminium hydroxide, and except that with respect to 100 parts by weight of the thus obtained cordierite-forming raw material, 10 parts by weight of graphite, 8 parts by weight of poly(ethylene terephthalate), and 15 parts by weight of poly(methyl methacrylate) were added as pore-forming agents.

Comparative Example 5

A honeycomb filter was obtained as in the case of Example 4, except that in Example 4 a cordierite-forming raw material was prepared as shown in Table 2 by mixing the following species in the ratio of 40% by weight of talc, 15% by weight of kaolin, 14% by weight of quartz B, 15% by weight of aluminium oxide and 16% by weight of aluminium hydroxide, and except that with respect to 100 parts by weight of the thus obtained cordierite-forming raw material, 20 parts by weight of graphite, 4 parts by weight of poly(ethylene terephthalate), and 9 parts by weight of poly(methyl methacrylate) were added as pore-forming agents.

Comparative Example 6

A honeycomb filter was obtained as in the case of Example 4, except that in Example 4 a cordierite-forming raw material was prepared as shown in Table 2 by mixing the following species in the ratio of 40% by weight of talc, 19% by weight of kaolin, 12% by weight of quartz B, 14% by weight of aluminium oxide and 15% by weight of aluminium hydroxide, and except that with respect to 100 parts by weight of the thus obtained cordierite-forming raw material, 20 parts by weight of graphite, 4 parts by weight of poly(ethylene terephthalate), and 7 parts by weight of poly(methyl methacrylate) were added as pore-forming agents.

Example 11

A honeycomb filter was obtained as in the case of Example 10, except that in Example 11, 2.4 parts by weight of an acrylic microcapsule, or a foam resin, (trade name: F-50E, manufactured by Matsumoto Yushi-Seiyaku Co., Ltd.) was charged with respect to 100 parts by weight of a cordierite-forming raw material without addition of graphite, poly(ethylene terephthalate) and poly(methyl methacrylate) as pore-forming agents as shown in Table 2.

Example 12

A honeycomb filter was obtained as in the case of Example 10, except that in Example 12 a cordierite-forming raw material was prepared as shown in Table 2 by mixing the following species in the ratio of 40% by weight of talc, 0% by weight of kaolin, 21% by weight of quartz D, 16% by weight of aluminium oxide and 23% by weight of aluminium hydroxide, and except that with respect to 100 parts by weight of the thus obtained cordierite-forming raw material, 10 parts by weight of graphite, 5 parts by weight of poly(ethylene terephthalate), 5 parts by weight of poly (methyl methacrylate), and 1.8 parts by weight of an acrylic microcapsule, or a foam resin, were added as pore-forming agents.

Example 13

A honeycomb filter was obtained as in the case of Example 10, except that in Example 13 a cordierite-forming raw material was prepared as shown in Table 2 by mixing the following species in the ratio of 40% by weight of talc, 5% by weight of kaolin, 19% by weight of quartz B, 17% by weight of aluminium oxide and 19% by weight of aluminium hydroxide, and except that with respect to 100 parts by weight of the thus obtained cordierite-forming raw material, 20 parts by weight of graphite and 2.8 parts by weight of an acrylic microcapsule, or a foam resin, were added as pore-forming agents.

Evaluation

In Examples 1 to 13, in which silica source components except both kaolin and talc have a particle size distribution of 1.0% by weight or less of a powder with a particle diameter of 75 μm or more, a honeycomb filter in which the volume of a pore of over 50 μm is controlled to be 10% or less of the total pore volume can be obtained; in this honeycomb filter as high a collection efficiency as 85% or more has been successfully attained. In particular, in Examples 3 and 5, in which silica source components except both kaolin and talc have a particle size distribution of 0.1% by weight or less of a powder with a particle diameter of 75 μm or more, a honeycomb filter in which the volume of a pore of over 50 μm is controlled to be 2% or less of the total pore volume can be obtained; in this honeycomb filter as extremely high a collection efficiency as 94% or more has been successfully attained.

On the other hand, in Examples 1 to 4, in which silica source components except both kaolin and talc have a particle size distribution of above 1.0% by weight of a powder with a particle diameter of 75 μm or more, a honeycomb filter in which the volume of a pore of over 50 μm exceeds 10% of the total pore volume can be obtained; in this honeycomb filter the collection efficiency has become as low as 75% or less.

In addition, in Examples 1 to 13, in which the content of kaolin is 10% by weight or less, a honeycomb filter in which the volume of a pore of 10 μm or less is controlled to be 15% or less of the total pore volume has been successfully obtained. When to this filter is mounted a catalyst, it is estimated that the plugging of pores due to a catalyst is restrained, leading to a small pressure loss during soot collection.

On the other hand, in Comparative Examples 5 and 6, in which the content of kaolin exceeds 10% by weight, a honeycomb filter in which the volume of a pore of 10 μm or less exceeds 15% of the total pore volume has been obtained. When to this filter is mounted a catalyst, it is estimated that pressure loss is large due to the plugging of pores by the catalyst.

Further, in Examples 11 to 13, in which 1.8 to 2.8 parts by weight of a foaming agent is added with respect to 100 parts by weight of a cordierite-forming raw material, a honeycomb filter with a porosity of from 68 to 75% can be obtained. In these honeycomb filters, as high collection efficiencies as 91% more have been successfully obtained and collection pressure losses are 8.5 (KPa) or less, i.e., pressure loss is small during soot collection.

Additionally, in Example 12, when a honeycomb filter was produced by altering the amount of foam resin to be added to 3.2 parts by weight, a honeycomb filter with a porosity of 80% has been obtained; however, the structure strength is not sufficient.

TABLE 1

| Cordierite-forming raw material component | Raw material | |
|---|---|---|
| | Average particle diameter (μm) | Content of a powder with a particle diameter of 75 μm or more (% by weight) |
| Talc | 20 | 4 |
| Kaolin | 10 | 2 |
| Quartz A | 20 | 8 |
| Quartz B | 19 | 0.3 |
| Quartz C | 5 | 3 |
| Quartz D | 5 | 0.1 |
| Quartz E | 10 | 0.1 |
| Fused silica A | 40 | 6 |
| Fused silica B | 35 | 0.5 |
| Fused silica C | 16 | 1 |
| Fused silica D | 70 | 39 |
| Aluminium oxide | 6 | 0.2 |
| Aluminium hydroxide | 2 | 0 |

TABLE 2

Raw material preparation composition (wt %)

| No. | Cordierite-forming raw material | | | | | | Pore-forming agent | | | |
|---|---|---|---|---|---|---|---|---|---|---|
| | | | Silica source component | | Aluminium oxide (% by weight) | Aluminium hydroxide (% by weight) | Graphite (parts by weight) | PET *1 (parts by weight) | PMM *2 (parts by weight) | Foam resin *3 (parts by weight) |
| | Talc (% by weight) | Kaolin (% by weight) | Component | Content (% by weight) | | | | | | |
| Example 1 | 37 | 0 | Fused silica B | 19 | 0 | 44 | 20 | 7 | 7 | 0 |
| Example 2 | 37 | 0 | Quartz B | 19 | 0 | 44 | 20 | 7 | 7 | 0 |
| Example 3 | 40 | 1 | Quartz D | 21 | 19 | 19 | 20 | 10 | 10 | 0 |
| Example 4 | 40 | 3 | Quartz B | 20 | 18 | 19 | 20 | 9 | 9 | 0 |
| Example 5 | 40 | 3 | Quartz D | 20 | 18 | 19 | 25 | 5 | 10 | 0 |
| Example 6 | 40 | 3 | Quartz E | 20 | 18 | 19 | 20 | 4 | 0 | 0 |
| Example 7 | 40 | 3 | Fused silica B | 20 | 18 | 19 | 20 | 3 | 9 | 0 |
| Example 8 | 40 | 3 | Fused silica C | 20 | 18 | 19 | 10 | 0 | 17 | 0 |
| Example 9 | 40 | 5 | Quartz B | 19 | 17 | 19 | 20 | 7 | 7 | 0 |
| Example 10 | 40 | 10 | Quartz B | 17 | 16 | 17 | 10 | 8 | 15 | 0 |
| Example 11 | 40 | 10 | Quartz B | 17 | 16 | 17 | 0 | 0 | 0 | 2.4 |
| Example 12 | 40 | 0 | Quartz D | 21 | 16 | 23 | 10 | 5 | 5 | 1.8 |
| Example 13 | 40 | 5 | Quartz B | 19 | 17 | 19 | 20 | 0 | 0 | 2.8 |
| Comparative example 1 | 37 | 0 | Fused silica A | 19 | 0 | 44 | 20 | 7 | 7 | 0 |
| Comparative example 2 | 40 | 3 | Quartz A | 20 | 18 | 19 | 20 | 7 | 9 | 0 |
| Comparative example 3 | 40 | 3 | Quartz C | 20 | 18 | 19 | 20 | 10 | 10 | 0 |
| Comparative example 4 | 40 | 3 | Fused silica D | 20 | 18 | 19 | 20 | 6 | 7 | 0 |
| Comparative example 5 | 40 | 15 | Quartz B | 14 | 15 | 16 | 20 | 4 | 9 | 0 |
| Comparative example 6 | 40 | 19 | Quartz B | 12 | 14 | 15 | 20 | 4 | 7 | 0 |

*1 PET: Poly(ethylene terephthalate)
*2 PMM: Poly(methyl methacrylate)
*3 Foam resin: Acrylic microcapsule

TABLE 3

| | | Pore distribution (%) | | | Average pore diameter | Coefficient of thermal expansion | Collection pressure loss | Collection efficiency |
|---|---|---|---|---|---|---|---|---|
| No. | Porosity (%) | to 10 $\mu$m | 10 to 50 $\mu$m | over 50 $\mu$m | ($\mu$m) | ($\times 10^{-6}/°$ C.) | (KPa) | (%) |
| Example 1 | 60 | 2 | 89 | 9 | 26 | 0.6 | 9.4 | 86 |
| Example 2 | 62 | 2 | 91 | 7 | 22 | 0.7 | 8.9 | 88 |
| Example 3 | 65 | 5 | 93 | 2 | 17 | 0.6 | 8.7 | 94 |
| Example 4 | 63 | 5 | 88 | 7 | 21 | 0.7 | 9.0 | 87 |
| Example 5 | 65 | 10 | 88 | 2 | 16 | 0.6 | 8.5 | 95 |
| Example 6 | 54 | 7 | 90 | 3 | 19 | 0.6 | 10.4 | 93 |
| Example 7 | 58 | 7 | 85 | 8 | 23 | 0.6 | 9.9 | 87 |
| Example 8 | 55 | 13 | 77 | 10 | 20 | 0.5 | 10.2 | 85 |
| Example 9 | 61 | 8 | 86 | 6 | 20 | 0.7 | 9.1 | 89 |
| Example 10 | 59 | 15 | 80 | 5 | 19 | 0.7 | 9.2 | 90 |
| Example 11 | 68 | 15 | 75 | 10 | 21 | 0.9 | 8.5 | 91 |
| Example 12 | 72 | 12 | 82 | 6 | 18 | 0.9 | 7.8 | 98 |
| Example 13 | 75 | 8 | 82 | 10 | 25 | 1.0 | 7.4 | 96 |
| Comparative example 1 | 60 | 2 | 83 | 15 | 28 | 0.6 | 9.4 | 71 |
| Comparative example 2 | 62 | 4 | 79 | 17 | 22 | 0.7 | 9.1 | 68 |
| Comparative example 3 | 65 | 11 | 77 | 12 | 17 | 0.6 | 8.7 | 75 |
| Comparative example 4 | 57 | 5 | 57 | 38 | 33 | 0.7 | 10.1 | 48 |
| Comparative example 5 | 58 | 19 | 75 | 6 | 19 | 0.7 | 9.7 | 90 |
| Comparative example 6 | 56 | 24 | 70 | 7 | 17 | 0.7 | 10.2 | 88 |

INDUSTRIAL APPLICABILITY

As has been described thus far, according to a porous honeycomb filter and a manufacturing method thereof of the present invention, a porous honeycomb filter of this invention has a high collection efficiency for particulates, or the like, and can prevent an increase in pressure loss due to the plugging of pores, and particularly can exploit the characteristics thereof for diesel engines that use recent high-pressure fuel injection, common rails, etc.

What is claimed is:

1. A porous honeycomb filter made from a material containing cordierite, a pore distribution thereof being controlled, as the primary crystalline phase, characterized in that said pore distribution is such that the volume of a pore with a diameter of less than 10 $\mu$m is 15% or less of the total pore volume, the volume of a pore with a diameter of 10 to 50 $\mu$m is 75% or more of the total pore volume, and the volume of a pore with a diameter of more than 50 $\mu$m is 10% or less of the total pore volume.

2. The porous honeycomb filter according to claim 1, characterized in that the porosity of the honeycomb filter is 50 to 75%.

3. The porous honeycomb filter according to claim 2, characterized in that the porosity of the honeycomb filter is 65 to 75%.

4. The porous honeycomb filter according to claim 3, characterized in that the honeycomb filter has a coefficient of thermal expansion of $1.0 \times 10^{-6}/°$ C. or less at from 40 to 800° C.

5. The porous honeycomb filter according to claim 2, characterized in that the honeycomb filter has a coefficient of thermal expansion of $1.0 \times 10^{-6}/°$ C. or less at from 40 to 800° C.

6. The porous honeycomb filter according to claim 1, characterized in that the honeycomb filter has a coefficient of thermal expansion of $1.0 \times 10^{-6}/°$ C. or less at from 40 to 800° C.

7. A method of manufacturing a porous honeycomb filter using a ceramic raw material containing a cordierite-forming raw material as the primary raw material, said method comprising:

forming a ceramic raw material containing a cordierite-forming raw material as a primary raw material;

molding the ceramic raw material into a raw molded article;

drying the raw molded article to form a dried molded article; and firing the dried molded article, wherein said cordierite-forming raw material contains 0 to 10% by weight of kaolin and has a particle size distribution such that powder with a particle diameter of 75 $\mu$m or more accounts for 1% by weight or less of silica ($SiO_2$) source components.

8. The method of manufacturing a porous honeycomb filter according to claim 7, characterized in that said cordierite-forming raw material contains 1 to 10% by weight of said kaolin.

9. The method of manufacturing a porous honeycomb filter according to claim 7, characterized in that silica ($SiO_2$) source components except both said kaolin and said talc contain at least one of quartz and fused silica.

10. The method of manufacturing a porous honeycomb filter according to claim 7, characterized in that said cordierite-forming raw material contains as alumina ($Al_2O_3$) source components at least one of aluminum oxide and aluminum hydroxide.

11. The method of manufacturing a porous honeycomb filter according to claim 10, characterized in that as said alumina ($Al_2O_3$) source component is contained 15 to 45% by weight of aluminum hydroxide with a particle, diameter of 1 to 10 μm.

12. The method of manufacturing a porous honeycomb filter according to claim 10, characterized in that as said alumina ($Al_2O_3$) source component is contained 0 to 20% by weight of aluminum oxide with a particle diameter of 4 to 8 μm.

13. The method of manufacturing a porous honeycomb filter according to 5, characterized in that said cordierite-forming raw material contains 37 to 40% by weight of talc as a magnesia (MgO) source component.

14. The method of manufacturing a porous honeycomb filter according to claim 13, characterized in that the particle diameter of said talc is 5 to 40 μm.

15. The method of manufacturing a porous honeycomb filter according to claim 7, characterized in that the ceramic raw material contains 1 to 4 parts by weight of a foam resin with respect to 100 parts by weight of the cordierite-forming raw material.

* * * * *